Oct. 13, 1964 D. DANIELS 3,152,799

POSITIONING MECHANISM FOR DUPLICATOR

Filed Nov. 2, 1962

INVENTOR.
Dennis Daniels
BY
ATTORNEYS

United States Patent Office 3,152,799
Patented Oct. 13, 1964

3,152,799
POSITIONING MECHANISM FOR DUPLICATOR
Dennis Daniels, Williamsville, N.Y., assignor to Houdaille
 Industries, Inc., Buffalo, N.Y., a corporation of
 Michigan
Filed Nov. 2, 1962, Ser. No. 235,047
9 Claims. (Cl. 269—74)

This invention relates generally to machine tools of the duplicating machine type, and more specifically to an improved mechanism incorporated therein for shifting a work-piece member relatively to a reference member, such mechanism including a double-acting locking structure.

Although the principles of the present invention may be included in various machine tools, a particularly useful application is made in machine tools of the duplicator type that require a workpiece to be shifted relatively to a reference point, such shifting typically corresponding to the shifting of a stylus with respect to a template. In particular, when such a device is employed, it is frequently desirable to shift the workpiece to a successive series of positions which lie in a straight line, or which lie in a straight line perpendicular to said first-mentioned straight line.

The present invention contemplates the utilization of lock means on such a shifting mechanism, which lock means are adapted and are operative to effect selective locking in a single axis, such locking in one axis being alternative with the locking in the other axis and being under the control of a single manually operated knob.

Accordingly, it is an object of the present invention to provide an improved positioning mechanism for a duplicator type of machine tool.

Another object of the present invention is to provide a double-acting lock for a positioning mechanism.

Yet another object of the present invention is to provide selectively effective 2-axis locking means in a workpiece shifting device.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 1:
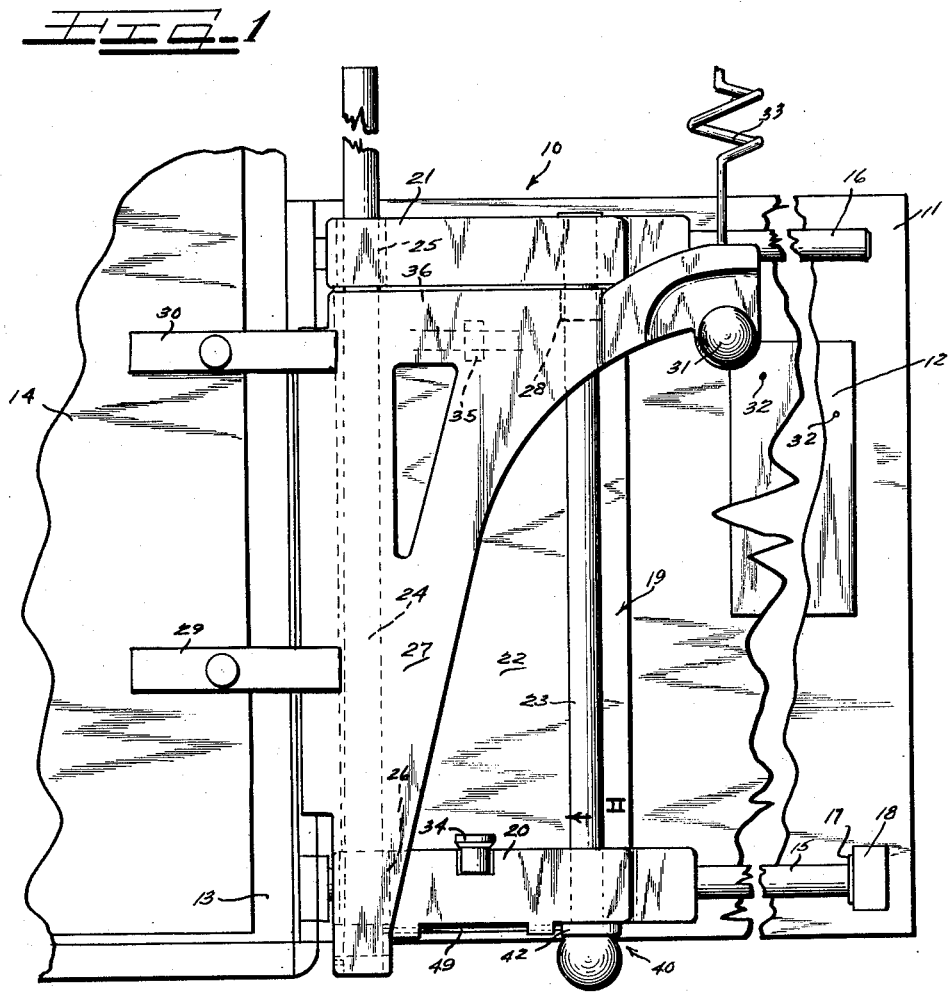
Figure 2:
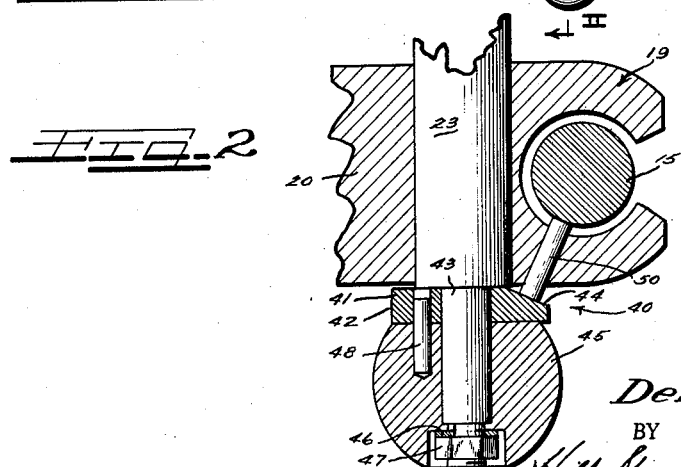

On the drawings:

FIGURE 1 is a fragmentary plan view of a positioning mechanism equipped with double-acting lock means provided in accordance with the principles of the present invention; and FIGURE 2 is an enlarged cross-sectional view taken along line II—II of FIGURE 1.

As shown on the drawings:

The principles of this invention are particularly useful when embodied in a positioning mechanism for a duplicator such as illustrated in FIGURE 1, generally indicated by the numeral 10. The positioning mechanism includes a duplicator table 11 adapted to support a template 12, the table 11 being secured to a workpiece-supporting table 13 of a machine tool, not otherwise illustrated. The machine tool of which the table 13 is a part typically comprises a punching machine provided with relatively reciprocating tool means which are adapted to act on a workpiece 14 supported on the workpiece table 13. Any point on the workpiece table 13 may comprise a reference point or member with respect to which the workpiece 14 is shifted.

On the duplicator table 11 there is disposed first elongated bar means which include lower fixed bar 15, 16. The bar 15, 16 are fixedly secured to the table 11 in slightly vertically spaced relation thereto. The bar 15 is provided with a bumper 17 and a bumper retainer 18, the latter also serving as bar support means for one end of the bar 15.

A carriage 19 is slidably supported on the bars 15 and 16, and to this end includes a forward block 20, a rearward block 21, and a web 22 which connects the blocks 20 and 21 together. The carriage 19 may comprises a unitary casting and is provided with suitable bearing means (not shown) in the blocks 20 and 21 to slidably support the carriage 19 on the bars 15 and 16.

Second elongated bar means are carried on the carriage 19 and include a pair of upper movable parallel bar 23, 24. The bar 23 may also be termed a lock bar for reasons set forth below and may be rotatably supported on the carriage 19. Means are provided at the opposite ends of the bar 23 to preclude any significant axial shifting thereof. The bar 24 is approximately twice the length of the bar 23, the additional length extending rearwardly in FIGURE 1. The bar 24 is slidably supported in bearings 25, 26 respectively carried in the carriage blocks 21, 20. Since the bar 24 is axially movable, it may also be referred to as a transverse or traverse bar.

A stylus and workpiece holder 27 is fixedly secured to the axially slidable bar 24, and is slidably supported on the axially fixed bar 23 by a bearing 28. A pair of workpiece clamps 29, 30, shown somewhat schematically, are secured to the holder 27 and are clamped to the workpiece member 14 for effecting joint movement between the workpiece member 14 and the holder 27. The holder 27 is also provided with a vertically movable stylus having a stylus knob 31, the lower end of the stylus being receivable in variously located apertures 32 in the reference member 12 which here comprises a template.

The operator may grasp the knob 31 and slide the holder 27 back and forth in the direction of the bars 23, 24, thereby moving the workpiece member 14 a corresponding amount. Such movement may therefore be with respect to predetermined points of reference on the template or reference member 12. When the stylus knob 31 is aligned with one of the template apertures 32, the lower end of the stylus will drop into the aperture 32, thereby closing a switch (not shown) connected to a cable 33 in the control circuit of the machine tool of which the workpiece table 13 is a part. To limit the distance which the stylus may be moved, for the purpose of protecting it, there is provided a fixedly secured stylus stop 34 on the carriage block 20 which is engageable with an adjustable screw 35 adjustably carried in a web 36 on the lower surface of the holder 27, the screw 35 being locked in position in a conventional manner. The stylus knob 31 may also be moved to the left and right to effect joint movement of the holder 27 and the carriage 19 on the bars 15, 16.

When it is desired to have movement of the workpiece 14 only in a direction parallel to that of the bars 23, 24, a lock means generally indicated at 40 is actuated to prevent any movement of the carriage 19 on the bar means 15, 16. Similarly, when it is desired that the workpiece member 14 should move only in a direction parallel to the bar means 15, 16, then the lock means 40 are actuated slightly differently to effect locking against movement on the bar means 23, 24.

To this end, the lock means 40 includes primarily a cam or cam ring 41 which has two rises or tracks which are out of phase angularly with respect to each other. More particularly, the cam 41 has a circular periphery 42 which comprises one of the tracks inasmuch as the cam ring 41 is eccentrically mounted on a reduced end portion 43 of the lock bar 23. The other track of the cam 41 comprises a generally axially directed track or surface 44 which varies in height for angular increments of movement about the axis of the lock rod 23. A lock knob 45 is also carried on the reduced end portion 43 and is secured thereto by means of a keyed washer 46 and a nut 47. A dowel pin 48 snugly received in the cam 41 and the knob 45 renders the cam 41 comovable with the knob 45. If desired, the knob 45 could be made integral with the cam 41 so that the pin 48 could be omitted.

The circumferential surface or track 42 engages one end of a lock rod or means 49 which is slidably supported in the carriage block 20, the other end of the lock rod 49 being directed against the axially slidable bar 24. By slight rotation of the lock knob 45, the lock rod 49 is axially shifted to frictionally engage the axially slidable bar 24 to lock the same against any sliding movement. It is seen that the end of the lock rod 49 will engage the axially slidable bar 24 at any of a number of possibly adjacent points which jointly define a line of engagement. The point of engagement on the axially slidable bar 24 thus is a relatively transversely movable point on a line, which line is fixed with respect to the holder 27 and hence is fixed with respect to the workpiece member 14.

A second shorter lock rod 50 is also slidably supported in the carriage block 20, one end of the lock rod 50 engaging the generally axially directed cam face 44, and the other end thereof being engageable with the bar 15. Since the lock bar 23 is substantially fixed axially, rotation of the lock knob 45 will force the lock rod 50 endwise against the bar 15, thereby frictionally engaging the same to preclude movement of the carriage 19 in a direction parallel to the axes of the bar means 15, 16. Similarly, the end of the lock rod 50 will engage the bar 15 at a series of relatively transversely movable points which define a line, such line on the bar 15 being fixed with respect to the reference members 12 and 13.

It is preferable that the rise on the cam track 42 and the rise on the cam track 44 be so oriented with respect to each other than when the lock rod 49 is cammed against the bar 24, the lock rod 50 will be free, and that when the lock rod 50 is cammed against the bar 15, the lock rod 49 will be free. By this structure the cam tracks 42 and 44 are angularly out of phase with each other so that clockwise movement of the lock knob 45 will preclude holder movement in one direction, and so that counterclockwise movement of the lock knob 45 will preclude movement of the holder 27 in a transverse direction.

In the illustrated embodiment of the invention, it is the workpiece which has been shifted with respect to a tool. It is to be understood that the invention also contemplates the shifting of a tool with respect to a workpiece.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A device for shifting a workpiece member relatively to a reference member, comprising in combination:
    (a) first elongated bar means adapted to be rigidly supported with respect to one of the members;
    (b) a carriage normally freely slidably disposed on said first bar means;
    (c) second elongated bar means supported on said carriage, and extending in a direction perpendicular to said first bar means;
    (d) a holder for the other of the members, said holder being carried on said second bar means and normally movable freely in said direction with respect to said carriage; and
    (e) a selectively rotatable cam supported on said carriage and having two cam rises, said rises respectively having means adapted to lock said carriage against movement on said first bar means, and to lock said holder against movement with respect to said carriage.

2. A device for shifting a workpiece member relatively to a reference member, comprising in combination:
    (a) first elongated bar means adapted to be rigidly supported with respect to one of the members;
    (b) a carriage normally freely slidably disposed on said first bar means;
    (c) second elongated bar means supported on said carriage, and extending in a direction perpendicular to said first bar means;
    (d) a holder for the other of the members, said holder being carried on said second bar means and normally movable freely in said direction with respect to said carriage;
    (e) a selectively rotatable cam supported on one end of said second bar means and having two cam rises, said rises respectively having means adapted to lock said carriage against movement on said first bar means, and to lock said holder against movement with respect to said carriage.

3. A device for shifting a workpiece member relatively to a reference member, comprising in combination:
    (a) first elongated bar means adapted to be rigidly supported with respect to one of the members;
    (b) a carriage normally freely slidably disposed on said first bar means;
    (c) second elongated bar means supported on said carriage, and extending in a direction perpendicular to said first bar means;
    (d) a holder for the other of the members, said holder being carried on said second bar means and normally movable freely in said direction with respect to said carriage; and
    (e) a selectively rotatable cam supported on said carriage and having two cam rises, said rises respectively having means adapted to lock said carriage against movement on said first bar means, and to lock said holder against movement with respect to said carriage, said cam rises being disposed angularly out of phase with each other to enable selective locking against one of said movements at a time.

4. A device for shifting a workpiece member relatively to a reference member, comprising in combination:
    (a) first elongated bar means adapted to be rigidly supported with respect to one of the members;
    (b) a carriage normally freely slidably disposed on said first bar means;
    (c) second elongated bar means supported on said carriage, and extending in a direction perpendicular to said first bar means;
    (d) a holder for the other of the members, said holder being carried on said second bar means and normally movable freely in said direction with respect to said carriage; and
    (e) a selectively rotatable cam supported on said carriage and having two cam rises, said rises respectively having means adapted to lock said carriage against movement on said first bar means, and to lock said holder against movement with respect to said carriage, one of said cam rises being on a generally axially directed face of said cam, and the other of said cam rises being on a circumferential surface of said cam.

5. A device for shifting a workpiece member relatively to a reference member, comprising in combination:
    (a) first elongated bar means adapted to be rigidly supported with respect to one of the members;
    (b) a carriage normally freely slidably disposed on said first bar means;
    (c) second elongated bar means supported on said carriage, and extending in a direction perpendicular to said first bar means;
    (d) a holder for the other of the members, said holder being carried on said second bar means and normally movable freely in said direction with respect to said carriage;

(e) a selectively rotatable cam supported on said carriage and having two cam rises; and (f) a pair of lock means driven by said cam rises and operative respectively to lock said carriage against movement on said first bar mean, and to lock said holder against movement with respect to said carriage.

6. A device for shifting a workpiece member relatively to a reference member, comprising in combination:

(a) first elongated bar means adapted to be rigidly supported with respect to one of the members;

(b) a carriage normally freely slidably disposed on said first bar means;

(c) second elongated bar means supported on said carriage, and extending in a direction perpendicular to said first bar means:

(d) a holder for the other of the members, said holder being carried on said second bar means and normally movable freely in said direction with respect to said carriage;

(e) a selectively rotatable cam supported on said carriage and having two cam rises; and (f) a pair of lock means driven by said cam rises and operative respectively to lock said carriage against movement on said first bar means, and to lock said holder against movement with respect to said carriage, at least one of said lock means comprising a rod slidably guided and supported by said carriage, said rod being engageable endwise with one of said rises, and with a relatively transversely movable point on one of said bar means which is fixed with respect to one of the members.

7. A device for shifting a workpiece member relatively to a reference member, comprising in combination:

(a) first elongated bar means adapted to be rigidly supported with respect to one of the members;

(b) a carriage normally freely slidably disposed on said first bar means;

(c) second elongated bar means supported on said carriage, and extending in a direction perpendicular to said first bar means;

(d) a holder for the other of the members, said holder being carried on said second bar means and normally movable freely in said direction with respect to said carriage;

(e) a selectively rotatable cam supported on said carriage and having two cam rises; and (f) a pair of lock rods each slidably guided and supported by said carriage, the rods being engageable endwise respectively with said cam rises, and respectively with relatively transversely movable points on said bar means which are respectively fixed with respect to the members to lock said carriage against movement on said first bar means, and to lock said holder against movement with respect to said carriage.

8. A device for shifting a workpiece member relatively to a reference member, comprising in combination:

(a) first elongated bar means adapted to be rigidly supported with respect to one of the members;

(b) a carriage normally freely slidably disposed on said first bar means;

(c) second elongated bar means comprising a pair of parallel bars supported on said carriage and extending in a direction perpendicular to said first bar means, one of said bars being supported in an axially fixed position and the other of said bars being axially slidably supported;

(d) a holder for the other of the members, said holder being comovably secured to said axially slidable bar and being slidably carried on said axially fixed bar, said holder being normally movable freely in said direction with respect to said carriage;

(e) a selectively rotatable cam supported on said axially fixed bar and having two rises; and (f) a pair of lock rods each slidably guided and supported by said carriage, the rods being engageable endwise respectively with said cam rises, one rod being also engageable at its other end with said axially slidable rod to lock said holder against movement with respect to said carriage, and the other rod being also engageable at its other end with said first elongated bar means to lock said carriage against movement.

9. A device for shifting a workpiece member relatively to a reference member, comprising in combination:

(a) first elongated bar means adapted to be rigidly supported with respect to one of the members;

(b) a carriage normally freely slidably disposed on said first bar means;

(c) second elongated bar means supported on said carriage, and extending in a direction perpendicular to said first bar means;

(d) a holder for the other of the members, said holder being carried on said second bar means and normally movable freely in said direction with respect to said carriage; and (e) a selectively rotatable cam supported on one end of said second bar means and having two cam rises, one of said cam rises being on a generally axially directed face of said cam, and the other of said cam rises being on a circumferential surface of said cam, said rises respectively having means adapted to lock said carriage against movement on said first bar means, and to lock said holder against movement with respect to said carriage, said cam rises being disposed angularly out of phase with each other to enable selective locking against one of said movements at a time.

References Cited in the file of this patent

UNITED STATES PATENTS 1,967,626    Plummer  --------------- July 24, 1934
2,816,465    Honnef  ---------------- Dec. 17, 1957